INVENTORS.
CHRISTIAN DOERSCHLAG
DONALD G. TERRIL
ATTORNEYS

July 4, 1967    C. DOERSCHLAG ETAL    3,328,819
WHEEL WASHER
Filed Jan. 10, 1966    3 Sheets-Sheet 2

INVENTORS.
CHRISTIAN DOERSCHLAG
DONALD G. TERRIL
BY
ATTORNEYS

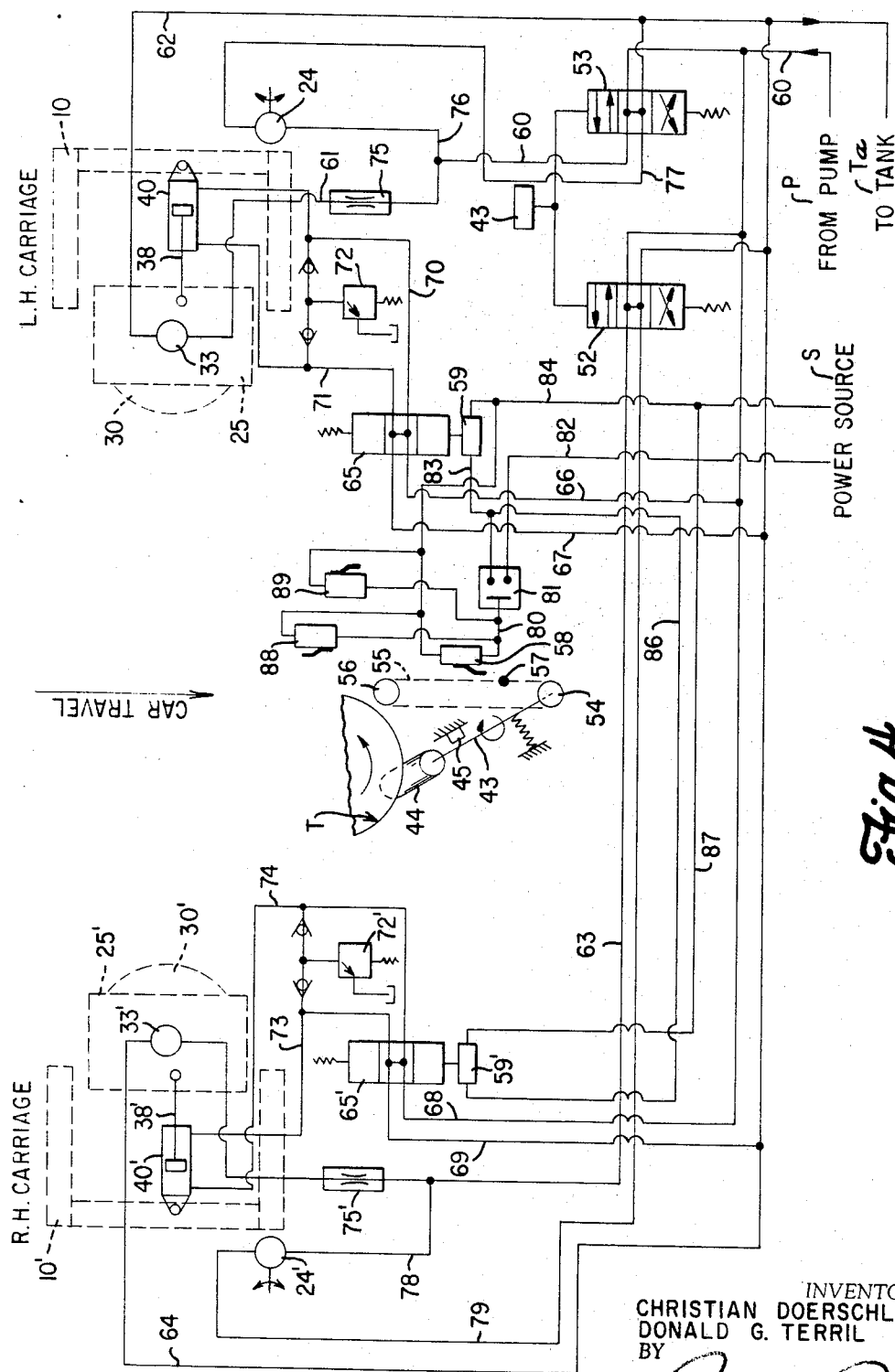

United States Patent Office 3,328,819
Patented July 4, 1967

3,328,819
WHEEL WASHER
Christian Doerschlag, 1019 Maple Ave., and Donald G. Terril, Summit Drive, Rte. 2, both of Zanesville, Ohio 43701
Filed Jan. 10, 1966, Ser. No. 519,642
3 Claims. (Cl. 15—21)

This invention relates to automatic motor vehicle wash installations but is more particularly concerned with the washing of the wheels of the vehicle as the latter advances through the wash installation.

An object is to produce a wheel washing device involving a carriage which is hydraulically driven to travel at approximately the same speed as that of the motor vehicle and after the circumference of the wheel has been washed, the carriage automatically retracts abruptly to its initial position preparatory to the next washing operation.

Another object is to produce a wheel washing device which is rendered operative by engagement of the vehicle to be washed and thereafter automatically renders the wheel cleaning brush and the traction means operative to effect the desired cleaning action until completion of the operation and then automatically returns to initial position, the to and fro movement of the wheel washing device being independent of the vehicle except to be initiated thereby.

A further object is to produce a vehicle wheel washer for an automatic car wash installation in which the wheel washer constitutes a separate power driven carriage having devices rendered operative upon initial engagement by the vehicle to be washed to effect carriage advancing and retracting movements and the washing operation in ordered succession and in a completely automatic manner.

A still further object is to produce a vehicle wheel washer for an automatic car wash installation which is triggered by the car to be washed and is powered both as to its advancing and retracting movements and also as to the starting and stopping of the wheel washing operation.

A still further object is to provide a vehicle wheel washer with a feeler member engaged by a tire of the car to be washed and rotated thereby as the car is advanced to cause retraction of the wheel washing device and retrograde movement of the washer after the wheel has been washed.

A still further object is to provide a pair of wheel washer units disposed on opposite sides of the car to be washed, one of the units having a feeler engaged by a tire of the car which when actuated thereby renders effective both wheel washers and track means to cause movement of the units along with the car until wheel washing has been completed whereupon the washers shift away from the car and the units move back to their position of rest.

Other objects and advantages of the invention will hereinafter appear and, for purposes of illustration but not of limitation, an embodiment of the invention is shown on the accompanying drawings, in which FIGURE 1 is a top plan view of one of the wheel washing carriages and the track on which it travels;

FIGURE 4 is a schematic view showing the hydraulic and electrical diagram illustrating features of the operation and control of the wheel washing carriages.

Figure 1:
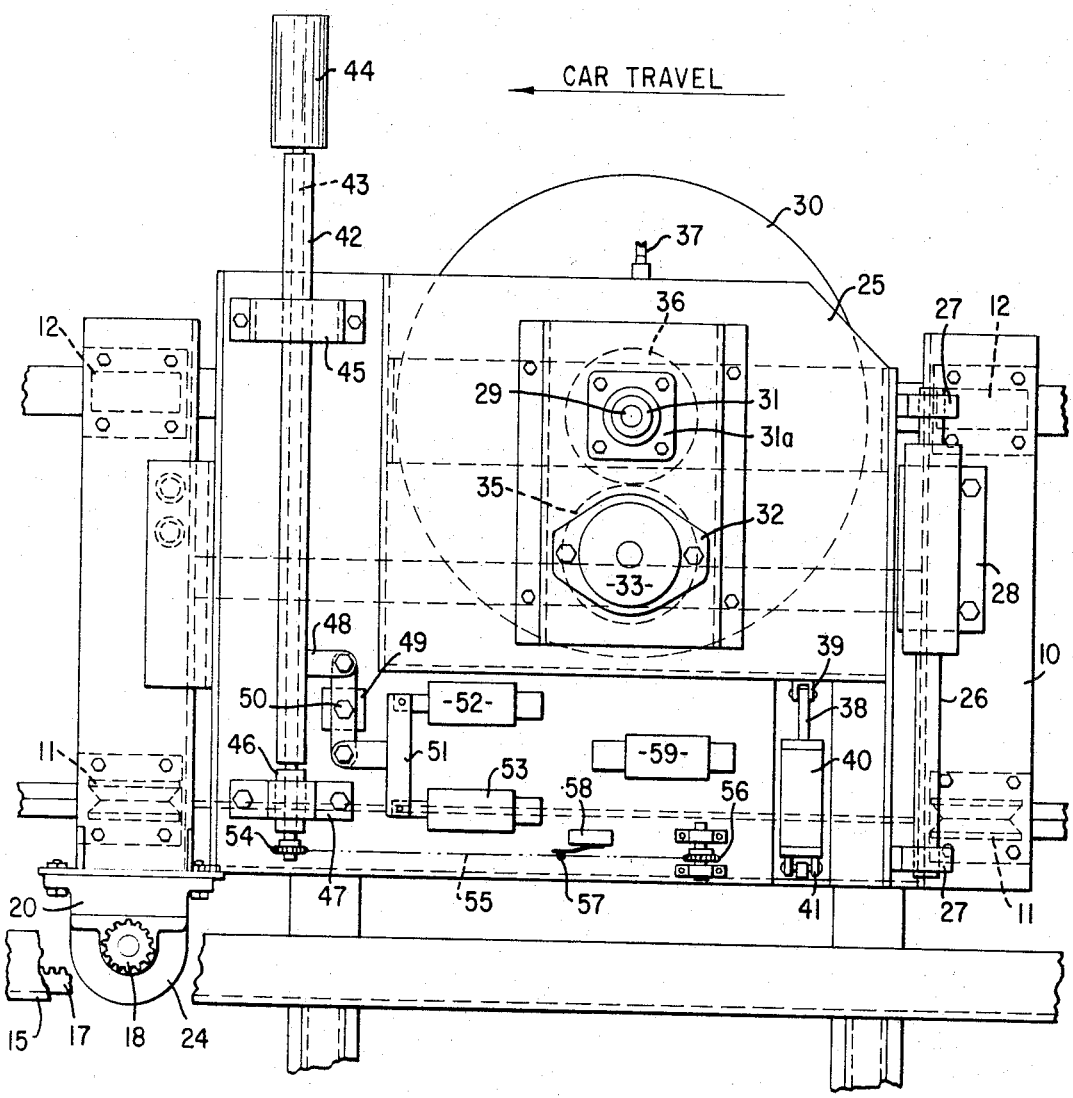
Figure 2:
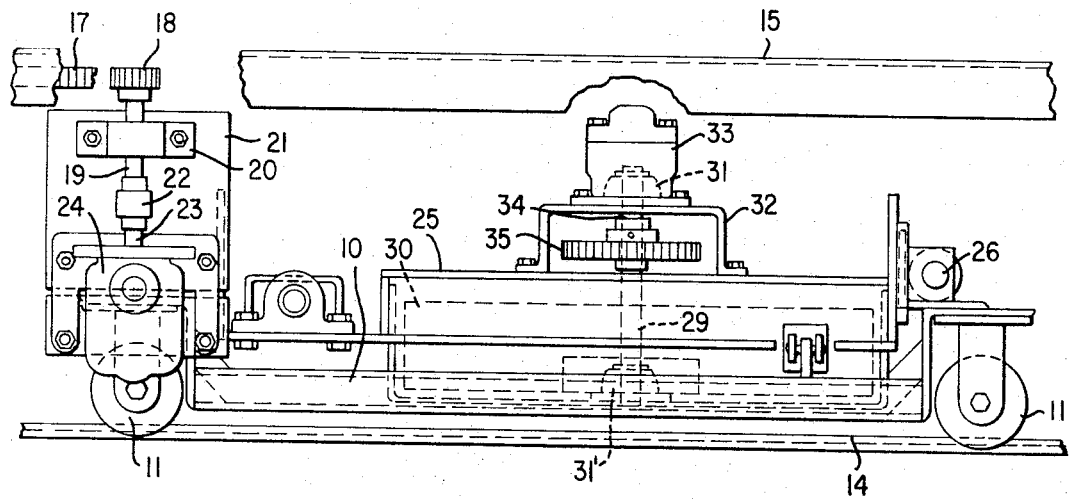
FIGURE 2 is a side elevation of the wheel washing carriage shown in FIGURE 1.
Figure 3:
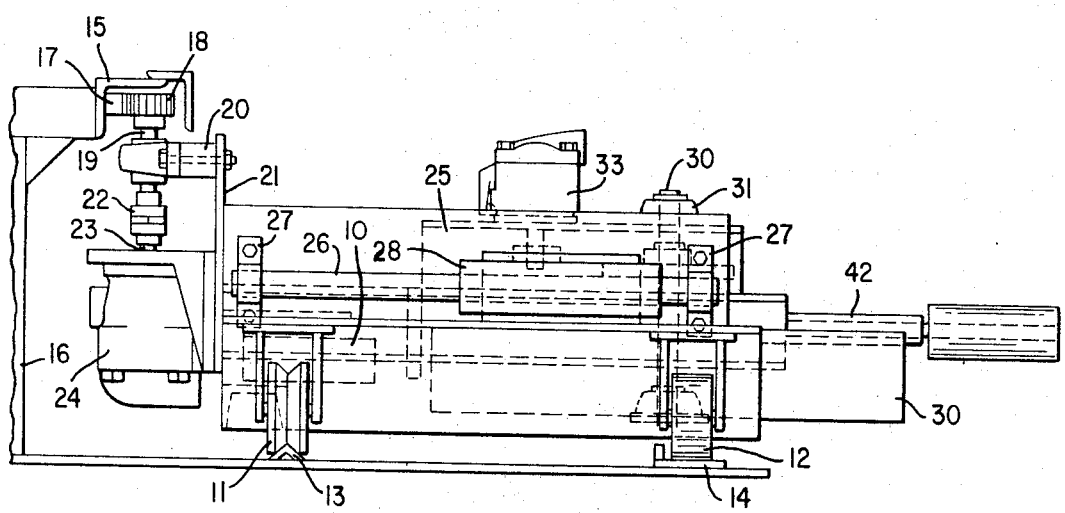
FIGURE 3 is a rear end elevation of the wheel washing carriage shown in FIGURE 1.

Referring particularly to FIGURES 1 to 3, a fabricated sheet metal main carriage 10 has pairs of longitudinally spaced supporting wheels at opposite sides indicated at 11 and 12. The wheels 11 are contoured to ride on inverted V tracks 13 to insure that the carriage moves in the proper path. The wheels 12 have flat rims to roll on ribbon-like tracks 14. On the outside of the tracks 14 is a horizontally disposed beam structure 15 supported in elevated position by a series of spaced L-shaped posts 16. Bolted to the inside of and extending outwardly from the beam structure 15 is a horizontally extending rack 17 and meshing with the rack 15 to impart translatory movements to the main carriage 10 is a pinion 18 fixed to the upper end of a vertical shaft 19. The shaft 19 is supported by a bearing bracket 20 which is carried by an upright support plate 21 fixed to the outer side of the carriage 10. The lower end of the shaft 19 is connected by a coupling 22 to a drive shaft 23 forming a part of a reversible hydraulic motor 24, which is suitably supported by the vertical support plate 21.

Mounted on the main carriage 10 for movements transversely thereof is a second or supplemental carriage 25. At one side of the carriage 25 and disposed transversely of the main carriage 10 is a horizontal guide rod 26 which is fixed to the carriage 25 by brackets 27. The horizontal guide rod 26 is slidable in an elongate bracket 28 which is fixed to the carriage 10 thereby to guide the to and fro movements of the supplemental carriage 25.

Carried by the supplemental carriage 25 is a rotary brush 30, which is carried by a vertically disposed shaft 29 suitably mounted in bearings 31 and 31' at the upper and lower end portions thereof, the upper bearing 31 being supported by a bracket plate 31a. A flanged housing 32 is secured to the supplemental carriage 25 and mounted thereon is a hydraulic motor 33, which has a drive shaft 34 depending into the housing 32. Fixed for rotation to the shaft 34 and disposed within the housing 32 is a gear 35 which meshes with a gear 36 fixed to the upper end portion of the brush shaft 29.

Carried by the supplemental carriage 25 in the region of the brush 30 and for directing a stream of water and detergent against the wheel to be cleaned is a nozzle 37 which may be supplied with liquid under pressure from any suitable source (not shown).

The supplemental carriage 25 can be advanced and retracted with respect to the main carriage 10 and for this purpose a hydraulic piston and cylinder assembly is employed. As shown, a piston rod 38 has a pivotal connection 39 with the inner end of the carriage 25, the piston for the same operating within a cylinder 40, which in turn is pivotally connected at its outer end at 41 to the main carriage 10. As will hereinafter be more fully described liquid under pressure is introduced to the forward or rearward ends of the cylinder 40 for advancing or retracting the carriage 25. It will thus be understood that the carriage 25 is advanced in order to position the brush 30 in washing engagement with the wheel of the vehicle and after washing has been accomplished the brush is moved away from the wheel by retraction or retrograde movement of the carriage 25.

Mounted on the supplemental carriage 25 is a feeler device which includes a transversely arranged tube 42, a portion of which projects laterally beyond the side of the carriage and the remainder of which extends the greater part of the width thereof. Rotatable within the tube 42 is a shaft 43, the outer end of which projects substantially beyond the outer end of the tube 42 and fixed to this projecting end for rotation therewith is an elongate drum 44. As will hereinafter be more fully described, the tire of the car to be washed engages the drum 44 and as the car advances the time imparts rotary motion to the drum 44 thereby imparting turning movement to the shaft 43. An inverted U-shaped bracket 45 fits over the tube 42 and provides a stop for limiting the rocking movements of the tube. At the opposite end of the tube 42 the shaft 43 projects a short distance through a bearing tube 46, which is mounted for limited rocking movement in a bracket 47.

Fixed to the inner end portion of the feeler tube 42, and extending at right angles thereto, is a relatively short rigid arm 48, to the outer end of which is pivoted a link 49 having a central pivot 50 on the supplemental carriage 25. The opposite end of the link 49 is pivoted a T-shaped arm 51, to opposite ends of which are pivoted spring-tensioned four way control valve assemblies 52 and 53, respectively. It will be understood that rocking movement of the feeler tube 42 in one direction or the other imparts movements to the valves 52 and 53. Normally the springs associated with the valves 52 and 53 urge the feeler tube 42 against the right-hand end of the bracket stop 45.

Operatively connected to the inner end of the rotary shaft 43 is a stub shaft carrying a sprocket wheel 54, over which an endless chain 55 is trained, the opposite end of the chain 55 passing about a sprocket wheel 56. The endless chain 55 has a special link 57 having an abutment element which is adapted to engage an electric micro-switch 58. The electrical and hydraulic devices and connections will hereinafter be described but at this time it may be mentioned that the rotation of the shaft 43 by the drum 44 in response to the advancing movement of the tire imparts movement to the endless chain 55 so that after one complete revolution of the tire has been made, the special link 57 engages the micro-switch 58 and through devices hereinafter to be described, the main cariage 10 will return to its position of rest for engagement with the next oncoming wheel.

Shown mounted on the supplemental carriage 25 is a solenoid controlled valve 59 for causing retraction of the brush 30 and the supplemental carriage 25, as will more fully be described hereinafter.

The operation of the above apparatus and the associated control devices is schematically shown on FIGURE 4 and will now be described. Similar reference numbers are used for the right hand carriage but are primed.

In the normal or rest position of the main carriage 10, it will be understood that both the right and left hand carriages are at the beginning of the track with both brushes 30 and 30' in extended position toward the centerline of the car run where they are held by the pistons 38 and 38' respectively. These pistons are controlled by spring held spool valves 65 and 65' on the left and right hand carriages respectively. The valve 65 has a line 66 to a hydraulic pump P and a line 67 to a tank Ta. The valve 65' has a line 68 leading from the pump P and a line 69 extending to the tank Ta. The valve 65 is normally spring held to a position to enable hydraulic fluid to be forced through a line 70 to the inner end of the cylinder 40 to force the piston and the supplemental carriage 25 with its brush 30 to extended wheel engaging position. The opposite end of the cylinder 40 is then connected to the tank Ta through the line 71. A relief valve 72 controls the contact pressure of the brush 30. For operation of the supplemental carriage 25' on the right hand carriage, lines 73 and 74 extend from the valve 65' to the cylinder 40' and a similar relief valve 72' is interposed between these lines for controlling the contact pressure of the brush 30'.

Thus it will be understood that when at rest, the centered spring loaded spools of the valve assemblies 52 and 53 hold the feeler tube 42 against a fixed stop 45 and in such position the brush motors 33 and 33' and the track motors 24 and 24' are at rest.

When the tire T of a vehicle, which is advanced in any suitable manner through the car washing installation, engages the drum 44 of the feeler rod, the latter is rocked to actuate the valves 52 and 53 and open the ports A to full line pressure from the pump P through the line 60, hydraulic fluid passing from the valve 53 through the lines 60 and 61 to the brush motor 33 and thence through the line 62 to the tank or reservoir Ta. Likewise from the valve 52, fluid is forced through the line 63 to the brush motor 33' and back to the tank Ta through the line 64. Flow control valves 75 and 75' regulate the speed of the brushes 30 and 30' respectively.

Track motors 24 and 24' start to operate to move the right and left hand carriages alongside the advancing vehicle as further forward movement of the feeler rod opens the ports B of valves 52 and 53. This enables the flow of pressure fluid from the valve 53 to the motor 24 through the branch line 76 and back to the tank Ta through the line 77 which joins the line 62. From the valve 52 pressure fluid passes to the track motor 24 through the branch line 78 and back to the tank Ta through the line 79 and line 62. Speed control of the track motors 24 and 24' is effected by a metering action of the four-way valves 53 and 52 respectively.

As the tire C begins to rotate, it imparts rotary movement to the measuring drum 44 with which it has frictional contact and the shaft 43 is thus driven. Accordingly the sprocket wheel 54 is rotated causing movement of the chain 55 and sprocket wheel 56. The special link 57 on the chain is adapted upon contact to actuate the electric micro-switch 58. The travel of the link 57 is equal to the circumference of the tire T so that after a full revolution of the tire, the switch 58 is closed. The switch 58 is connected through a lead 80 to a time delay relay 81 connected to a power source S through a lead 82. The relay 81 connects to the solenoid 59 by a lead 83, the solenoid 59 being connected to the power source S by a lead 84 from which branches a lead 85 to the micro-switch 58. A lead 86 branches from the solenoid lead 83 and extends to the solenoid 59' on the right hand carriage. A lead 87 from the solenoid 59' extends to the hot lead 84.

It will be apparent that the time delay relay 81 energizes the solenoids 59 and 59' causing actuation of valves 65 and 65' switching liquid to the opposite ends of the cylinders 40 and 40' to cause retraction of the carriages 25 and 25' so that the brushes 30 and 30' are moved away from the wheels of the vehicle.

After the feeler rod has lost contact with the tire T the spring action of the valves 52 and 53 rocks the feeler rod against the stop 45 and reverses the pressure ports of these valves, shutting off the supply of pressure fluid to the brush motors 33 and 33' and directing all fluid to the track motors 24 and 24' enabling a high speed return of the carriages to rest position.

The time delay period of the relay switch 81 is equal to the time required for the carriages to reach rest position. Then the solenoids 59 and 59' are deenergized and liquid under pressure is admitted to the cylinder end of the cylinders 40 and 40' to advance the brush carriages 25 and 25' to position the brushes in washing position for the next wheels to be washed.

In case of malfunction of the chain mechanism and measuring device, limit switches 88 and 89 are arranged at the end of the track travel and are engaged by the carriages to perform the function served by the micro-switch 58.

From the above description, it will be understood that advancing movement of the main carriages 10 and 10' is caused by action of the feeler rod assembly including the drum 44 which is rotated by frictional engagement with the tire T and they travel along with the vehicle at the same speed. The brushes 30 and 30' have been advanced into wheel cleaning position and rotary movement is imparted to them. This continues until the circumference of the wheel has been cleaned whereupon the supplemental carriages 25 and 25' retract to move the brushes away from the vehicle and by rapid movements the main carriages 10 and 10' return to their positions of rest. Finally the brushes 30 and 30' are again advanced to cleaning positions preparatory to work on the next set of wheels.

Numerous changes in details of construction, arrangement and choice of materials may be effected without

What we claim is:

1. A vehicle wheel washer for an automatic car wash installation through which the cars are successively advanced, comprising a main carriage mounted for to and fro movement alongside the path of travel of the car to be washed, means for imparting traveling movement to said carriage from a position of rest to a predetermined point and then retrograde movement to said position, said traveling movement imparting means including a shiftable feeler device on the carriage to be actuated by the tire of an advancing car to be washed for rendering such means operative, means forming a part of said feeler device, rotatable by the car tire, control means operatively connected to said rotatable means for causing accelerated retrograde movement of the carriage as soon as the circumference of the wheel has been scrubbed, a brush for wheel scrubbing movable with said carriage, means for rotating said brush, and means to project said brush to wheel scrubbing position during advancing movement of said carriage and to retract said brush during retracting carriage movement.

2. A vehicle wheel washer as claimed in claim 1 in which the feeler device comprises rod means on the carriage having an end portion projecting laterally thereof, a drum on the projecting end of said rod to be rotated by a tire of the car to be washed, and means responsive to rotation of the rod to cause retrograde movement of the carriage after a complete revolution of the tire.

3. A vehicle wheel washer as claimed in claim 1 in which the feeler device comprises a tube arranged transversely of and projecting from one side of the carriage, a rotatable rod within said tube, a drum fixed to the outer end of the rod to be engaged and rotated by a tire of the car to be washed, a pivotal mounting for the inner end of said rod, stop means limiting the pivotal movement of said rod and tube, means on the tube responsive to pivotal movement thereof for causing the advancing movement of the carriage, and means responsive to rotary movement of the rod to cause retrograde movement of the carriage after a complete revolution of the car tire has taken place.

References Cited

UNITED STATES PATENTS 2,814,825   12/1957   Guthrie et al.
2,978,718   4/1961    Vani et al.
3,208,089   9/1965    Vani.

CHARLES A. WILLMUTH, *Primary Examiner.*

E. L. ROBERTS, *Assistant Examiner.*